Aug. 17, 1937.   H. L. SMITH   2,090,556
POTATO AND VEGETABLE DIGGING MACHINE
Filed Feb. 1, 1937   2 Sheets-Sheet 2
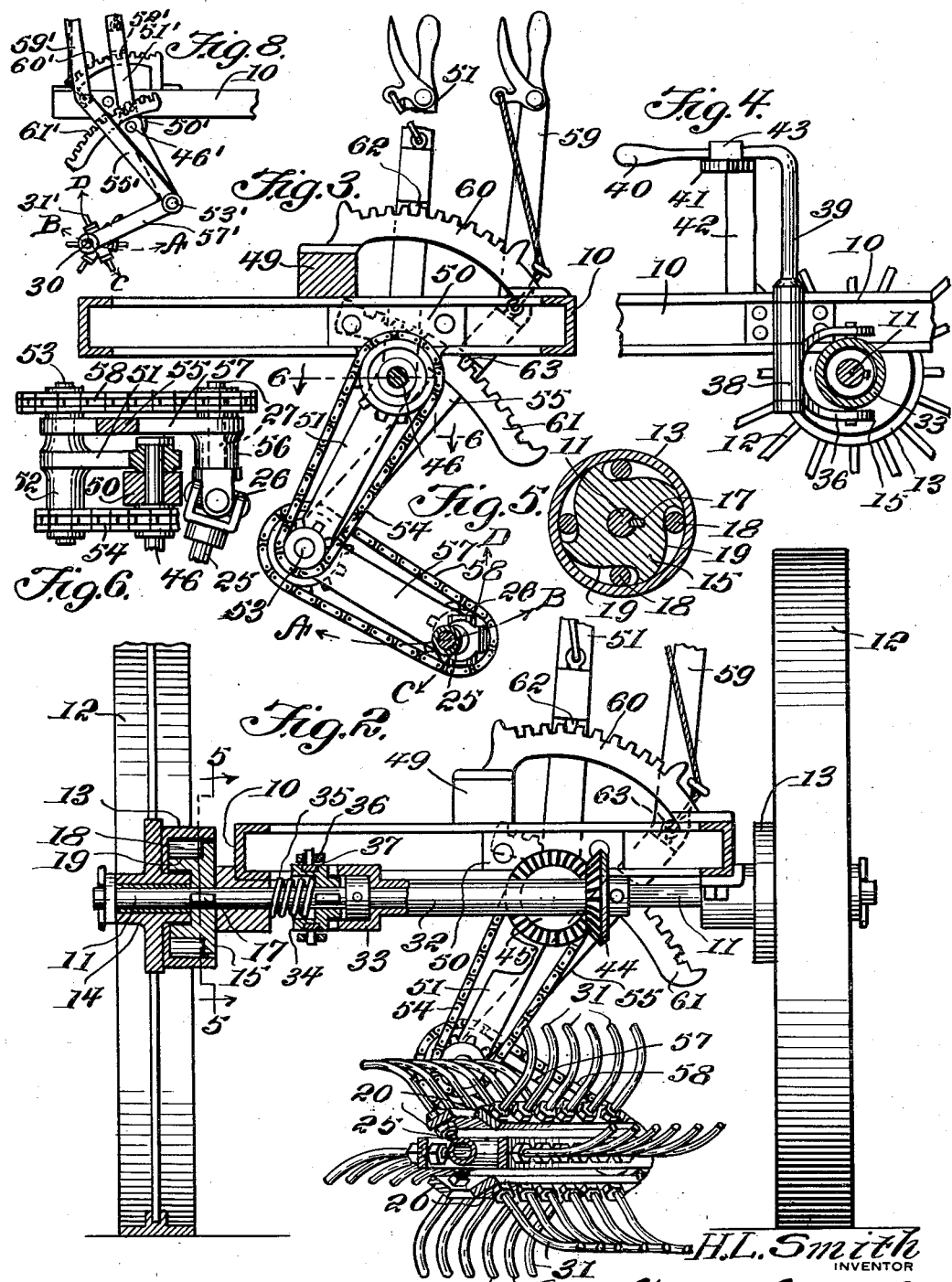

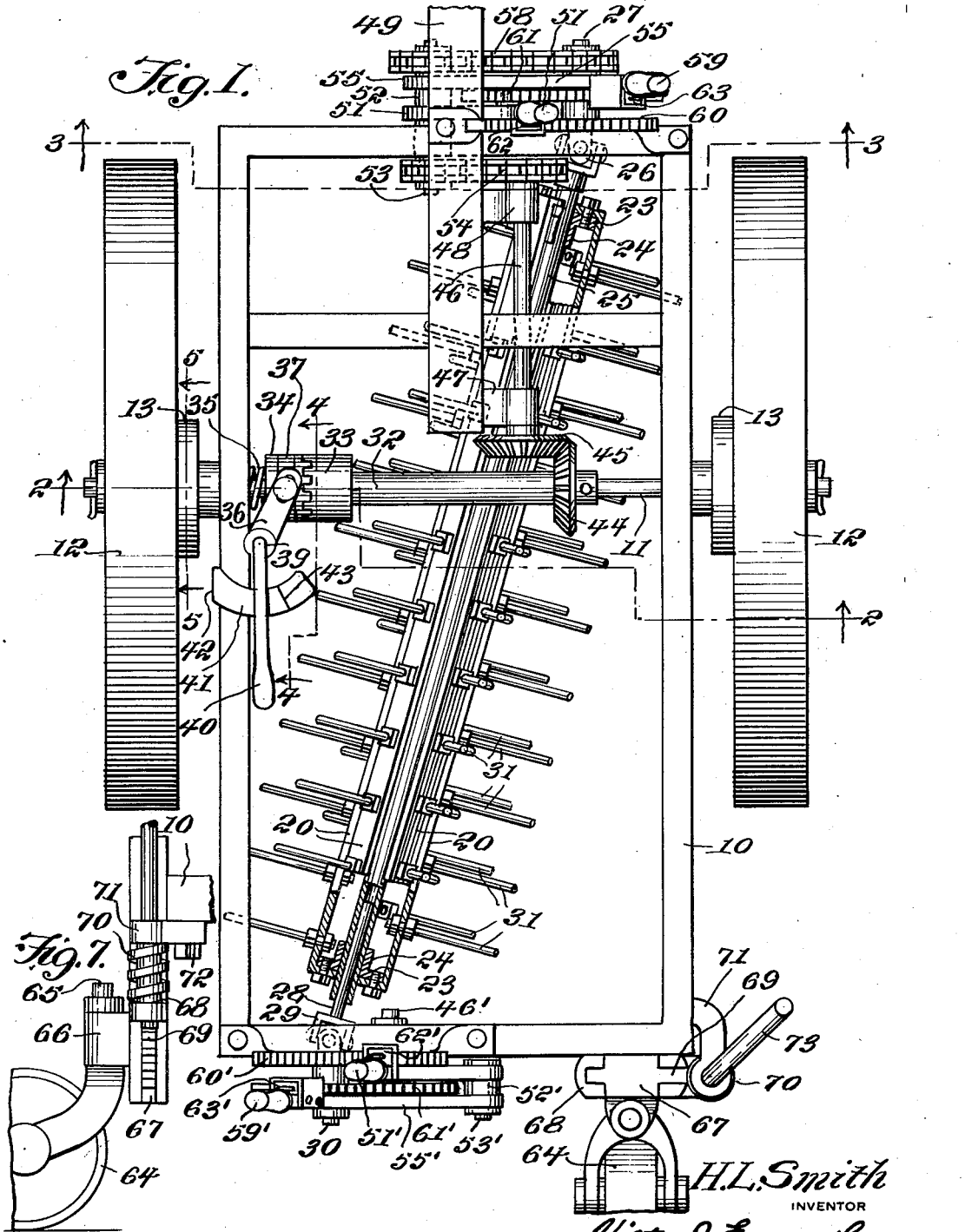

Patented Aug. 17, 1937

2,090,556

UNITED STATES PATENT OFFICE 2,090,556

POTATO AND VEGETABLE DIGGING MACHINE

Hermon L. Smith, Gloversville, N. Y.

Application February 1, 1937, Serial No. 123,469

2 Claims. (Cl. 55—59)

This invention relates to potato and vegetable digging machines and has for an object to provide a device of this character having novel means for effecting the elevation and lowering, as well as swinging laterally the digging member, at either end, so that the device may be adjusted for the work which it is to perform.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a plan view of a potato and vegetable digging machine constructed in accordance with the invention.

Figure 2 is a cross sectional view taken on the line 2—2 of Figure 1 showing the mechanism for adjusting and driving the digging member at the front end.

Figure 3 is a cross sectional view taken on the line 3—3 of Figure 1 showing the adjusting and driving mechanism in detail.

Figure 4 is a detail cross sectional view taken on the line 4—4 of Figure 1 showing the clutch mechanism.

Figure 5 is a cross sectional view taken on the line 5—5 of Figure 1 showing one of the over-running clutches for the wheels.

Figure 6 is a cross sectional view taken on the line 6—6 of Figure 3 showing the driving and elevating mechanism for the front end of the digging member.

Figure 7 is a side elevation of the adjustable caster wheels for supporting the rear end of the machine frame.

Figure 8 is a detail view in elevation showing the digging member adjusting mechanism at the rear end of the machine.

Referring now to the drawings in which like characters of reference designate similar parts in the various views, 10 designates a machine frame, the same being preferably formed of channel iron and being substantially rectangular in contour. An axle 11 is mounted on the frame and is provided with ground wheels 12 having over-running clutches to rotate the axle when the machine is advanced and to de-clutch the axle when the machine is backed. The clutches, as best shown in Figure 5, each comprise a housing 13 fixed to the wheel hub 14, as shown in Figure 2, and a ratchet member 15 keyed to the axle 11, as shown at 17 in Figure 5, there being rollers 18 mounted in cam slots 19 and adapted to move to the low ends of the slots and clutch the housing to the ratchet member when the machine is being advanced and to move to the tip ends of the slots and de-clutch the housing from the axle when the machine is being backed.

The digging member comprises a plurality of slats 20, best shown in Figure 2, which are connected together at the ends by plates 23, best shown in Figure 1, the plates being provided with bearings 24. A hollow shaft 25 is journaled in the bearings and the forward end of the said shaft is connected by a universal joint 26 to a driving and adjusting shaft 27, which will be hereinafter described in detail. A shaft 28 is slidably fitted in the rear end of the hollow shaft and is connected by a universal joint 29 to an adjusting shaft 30 at the rear end of the machine, which also will be hereinafter be more fully described.

A plurality of arcuate resilient teeth 31, best shown in Figure 2, are arranged longitudinally of the slats and yield to pass over stones encountered below the surface of the earth. The teeth of each slat are staggered relatively to the teeth of the next adjacent slat so that when the digging member is rotated, all of the teeth will coact in forming a furrow, when the machine is advanced, to bring to the surface of the ground potatoes and other vegetables.

For rotating the digging member, a hollow shaft 32, best shown in Figures 1 and 2, is sleeved on the axle 11 and is clutched and de-clutched therefrom by a clutch comprising a toothed member 33, fixed to the sleeve, and a toothed member 34, splined on the axle, a spring 35 being housed in the splined member and normally holding the teeth of both members engaged. A shift yoke 36, best shown in Figure 4, is provided with a collar 37, which fits in an annular groove in the splined tooth member. The shift yoke is provided with a hub 38, also best shown in Figure 4, which receives a crank 39 that terminates in an angularly disposed handle 40 which is mounted to slide transversely on the horizontal portion 41 of a bracket arm 42 that rises from the frame 10. The handle may be shifted to move the hub 38 laterally and de-clutch the clutch, in which position of the parts the handle may be lodged in rear of a stop 43 to hold the clutch de-clutched.

The hollow shaft 32 is geared by bevel gears 44 and 45 to a countershaft 46 which extends longitudinally of the frame and is journaled in bearings 47 and 48 secured to the frame and to the draft tongue 49, as best shown in Figure 1.

The front end of the countershaft 46 is journaled in a bearing 50, that depends from the frame 10 as best shown in Figures 3 and 6. An angular handle lever 51 is pivoted at its elbow on the shaft 46 and the lower end of the lever carries a sleeve bearing 52 in which is journaled a stub shaft 53, best shown in Figure 6. The shaft 46 is geared to the stub shaft 53 by a chain drive 54. An L-shaped lever 55 is journaled at its elbow on the shaft 53 which, as before stated, is connected by the universal joint 26 to the front end of the hollow shaft of the digging member. The stub shaft 27 is journaled in a bearing 56 which is carried by the short leg 57 of the L-shaped lever 55. A chain drive 58 connects the stub shaft 27 with the stub shaft 53. The L-shaped lever is provided with an integral extension forming a handle lever 59. Racks 60 and 61 and respective pawls 62 and 63 are assembled with the respective handle levers 51 and 59 to latch them in adjusted positions. The rack 60 is attached to the frame 10 while the rack 61 is attached to the lever 51.

When the handle lever 51 is swung on its pivot shaft 46 the L-shaped lever 55 will be carried in an arc indicated by the lines A—B in Figure 3 to shift the front end of the digging member laterally. When the handle lever 55 is swung on its pivot shaft 53 the front end of the digging member will be raised or lowered along the line C—D as indicated in Figure 1. The chain drives 54 and 58 operate to drive the shaft 25 of digging member regardless of the adjusted position of the front end of the digging member.

For adjusting the rear end of the digging member vertically and horizontally the lever mechanism shown in Figures 5 and 6 is duplicated at the rear end of the machine, with the exception of the chain drives and these are dispensed with. More particularly, by referring to Figures 1 and 8, it will be seen that the parts of the lever mechanism at the front of the machine, that are duplicated at the rear of the machine, are designated by the same numerals as corresponding parts of the front of the machine, primed. For brevity and clearness it is not thought that the vertical and horizontal adjusting mechanism for the digging member, at the rear of the machine, need be referred to specifically by the reference numerals other than briefly to state that the L-shaped lever 55' when moved by its handle lever portion 59' adjusts the shaft 30 vertically along the line C—D while manipulation of the lever 51' swings the rear end of the digging member horizontally on the pivot shaft 46' along the line A—B.

As shown in Figures 1 and 7 the rear end of the machine is supported by a caster wheel 64, the shaft 65 of which is rotatably mounted in a bearing 66 carried by a slide 67 which moves vertically in a bracket 68 that is secured to the rear end of the frame. The slide is equipped with a rack 69 which engages a worm 70 carried by a bearing 71 which is bolted to the frame as shown at 72. The worm shaft is provided with a handle lever 73 by which the worm may be rotated to adjust the caster wheel vertically to support the rear end of the frame at any desired distance from the ground.

In operation, the toothed digging member may be adjusted to extend obliquely from corner to corner of the frame, by moving the front end or the rear end or both laterally and may be elevated vertically at the front end or at the rear end or both by manipulation of the levers 51, 59, 51' and 59' as previously described to suit various conditions of service.

From the above description it is thought that the construction and operation of the invention will be fully understood without further explanation.

What is claimed is:

1. A potato and vegetable digging machine comprising a frame, a wheeled axle supporting the frame, a toothed digging member extending obliquely from front to rear of the frame, levers pivoted on the frame and supporting the front and the rear ends of the digging member for lateral adjustment, levers pivoted on the first named levers and supporting the digging member for vertical adjustment, motion transmitting mechanism carried by the levers at one end of the frame and connected to the digging member for rotating the digging member on its axis, and driving mechanism connected to the axle and to the motion transmitting mechanism.

2. A potato and vegetable digging machine comprising a frame, a wheeled axle supporting the frame, a caster adjustably mounted on one end of the frame and coacting with the wheeled axle in supporting the frame, a shaft suspended from the frame and extending obliquely with respect to the longitudinal median line of the frame, plates on the end of the shaft, slats connecting the plates, resilient curved teeth fixed to the slats, the teeth of adjacent slats being staggered with respect to each other, levers pivotally mounted on the frame, other levers pivotally mounted on the first named levers and supporting the front and the rear ends of said shaft, adjustment of said levers adjusting the shaft vertically and laterally, chain drives carried by the levers at one end of the shaft and connected to the shaft for driving the shaft, and driving means connected to the axle and to the chain drives for actuating the chain drives.

HERMON L. SMITH.